A. H. PEYCKE.
BRAKE MECHANISM.
APPLICATION FILED AUG. 9, 1919.

1,329,010. Patented Jan. 27, 1920.

Witness:
R. Burkhardt

Inventor:
Armand H. Peycke,
By Wilkinson & Huxley
Attys.

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE MECHANISM.

1,329,010.      Specification of Letters Patent.      Patented Jan. 27, 1920.

Application filed August 9, 1919. Serial No. 316,318.

*To all whom it may concern:*

Be it known that I, ARMAND H. PEYCKE, a citizen of the United States, residing at Chicago, in the county of Cook and State of Illinois, have invented certain new and useful Improvements in Brake Mechanism, of which the following is a specification.

This invention relates to brake mechanism.

In arranging brake mechanism in the under structure of railway cars, especially passenger cars, the question of clearances between relatively movable parts is a problem difficult to solve, especially when attempting to apply a given type of brake rigging to cars the under structures of which vary widely.

One object of this invention is to overcome some of the clearance problems, particularly in connection with brake levers, fulcrums, and releasing means.

Another object is to provide a combination of parts in brake mechanism adapted to coöperate efficiently and meet the various requirements for successful commercial operation.

Figure 1:
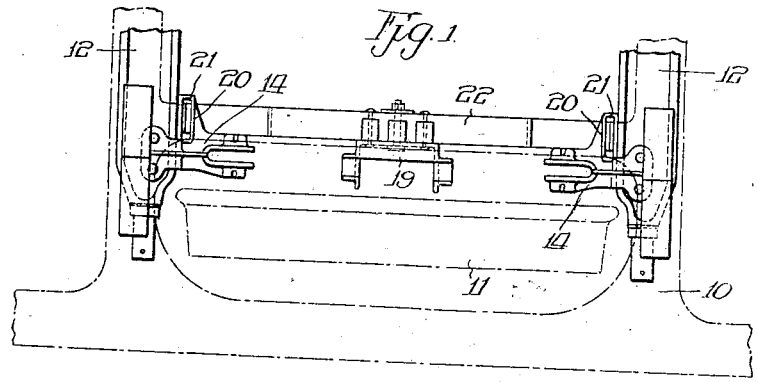
Figure 2:
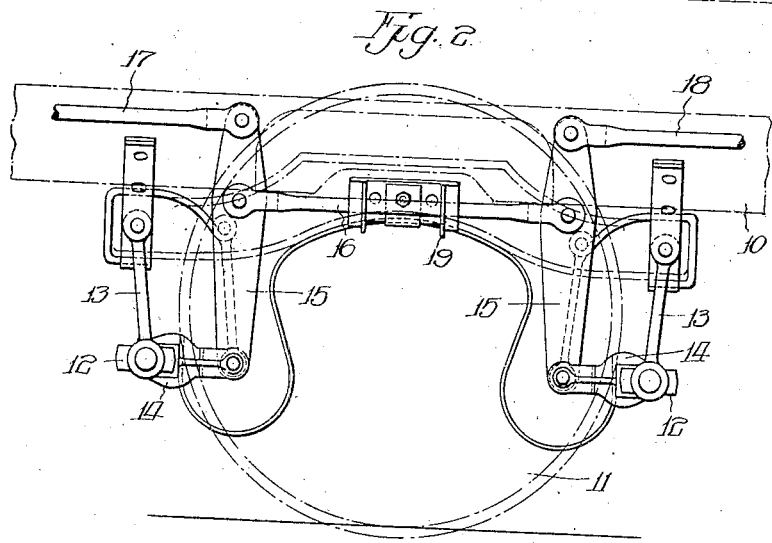
Figure 3:
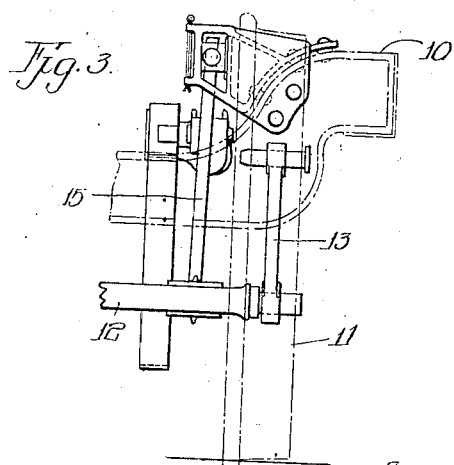

These and other objects are accomplished by means of the arrangement shown on the accompanying sheet of drawings, in which Figure 1 is a fragmentary plan view of a railway car truck embodying my invention, Fig. 2 is a fragmentary side elevation of the same, and Fig. 3 is a fragmentary end elevation of the same arrangement.

The various novel features of my invention will be apparent from the following description and drawings, and will be particularly pointed out in the appended claims.

Referring to the figures of the drawings, it will be noted that I have shown a railway car truck including a frame 10, carried by wheels 11, only one of which is shown, there being a brake beam 12 arranged at either side of each pair of wheels. These brake beams may be supported in any suitable manner, such as by means of hangers 13 which may be connected to the brake beams directly or indirectly as desired. Secured to each of the brake beams adjacent the ends thereof are fulcrum brackets 14, to the outer ends of each of which is secured a brake lever 15, said brake levers being connected by a tension rod 16 and otherwise connected in the brake system by means of tension rods 17 and 18 pivotally connected to the upper ends of said brake levers. The brake rigging is supported in place by a bracket 19 which slidably receives the tension rod 16.

In this particular arrangement there is not enough room to secure a regular spring clip on the brake beam at the right place and at the same time obtain the proper clearance conditions. Accordingly, to overcome this difficulty I have formed integrally with each of the fulcrum brackets a laterally-extending loop portion 20 having an opening 21 for the reception of the ends of a release spring 22, whereby proper brake releasing action may be effected under proper conditions. In this particular instance the release spring 22 acts upon the brake beams on opposite sides of each pair of wheels and is suitably supported at an intermediate point by the bracket 19, which in turn is supported upon the truck frame. By providing the fulcrum brackets with the integrally formed loop portion a release spring coöperating portion is formed which occupies the proper position in the amount of space accessible. It will be noted also that the jaws of the fulcrums 14 are angled for the reception of the lower ends of the brake levers 15, which are set at a slight angle to the vertical in order to meet clearance conditions.

There may be various modifications of my invention, and it is my intention to cover all such modifications which do not involve a departure from the spirit and scope of the invention as set forth in the following claims.

I claim:

1. In clasp brake mechanism, the combination of a brake beam, and a fulcrum bracket secured thereto, extending toward the wheel having a slot for the reception of a release spring.

2. In brake mechanism, the combination of a brake beam, and a fulcrum bracket secured thereto having an integrally formed loop member for the reception of a release spring.

3. In brake mechanism, the combination of a brake beam, and a fulcrum bracket secured thereto having a loop receiving portion for coöperative action with a release spring.

4. In brake mechanism, brake beams mounted on opposite sides of a pair of wheels, fulcrum brackets secured thereto having loop portions, and a release spring intermediate said brake beams engaging said loop portions of said fulcrum brackets for giving the brakes a releasing action.

5. In brake mechanism, the combination of a brake beam, a fulcrum bracket secured thereto having its jaws set at an angle, an inclined brake lever connected to said fulcrum bracket, said fulcrum bracket having a loop portion for the reception of a brake release spring.

Signed at Chicago, Illinois, this 6th day of August, 1919.

ARMAND H. PEYCKE.